(12) United States Patent
Richards

(10) Patent No.: US 10,248,943 B2
(45) Date of Patent: Apr. 2, 2019

(54) OBJECT RECOGNITION SYSTEM FOR CHECKOUT LANE MANAGEMENT

(71) Applicant: Indaflow LLC, Omaha, NE (US)

(72) Inventor: Jacob D. Richards, Omaha, NE (US)

( * ) Notice: Subject to any disclaimer, the term of this patent is extended or adjusted under 35 U.S.C. 154(b) by 146 days.

(21) Appl. No.: 15/599,222

(22) Filed: May 18, 2017

(65) Prior Publication Data
US 2017/0337539 A1    Nov. 23, 2017

Related U.S. Application Data

(60) Provisional application No. 62/337,942, filed on May 18, 2016.

(51) Int. Cl.
| | |
|---|---|
| *G01J 1/20* | (2006.01) |
| *G06T 7/00* | (2017.01) |
| *G06K 9/00* | (2006.01) |
| *G06K 9/62* | (2006.01) |
| *G06Q 20/20* | (2012.01) |

(52) U.S. Cl.
CPC ............. *G06Q 20/208* (2013.01); *G01J 1/20* (2013.01); *G06K 9/00624* (2013.01); *G06K 9/00771* (2013.01); *G06K 9/6202* (2013.01); *G06T 7/0008* (2013.01)

(58) Field of Classification Search
CPC ............. G06Q 20/208; G06Q 30/0225; G06Q 20/127; G06Q 20/12; G06Q 20/4016; G06K 9/00771; G06K 9/6202; G06F 17/30864

USPC ...................................... 705/23, 18
See application file for complete search history.

(56) References Cited

U.S. PATENT DOCUMENTS

| | | | |
|---|---|---|---|
| 9,390,596 B1* | 7/2016 | Todeschini ............. | H04W 4/80 |
| 2007/0253595 A1* | 11/2007 | Sorensen ................. | G07C 9/00 |
| | | | 382/103 |
| 2008/0169438 A1* | 7/2008 | Murata ................... | B41J 11/009 |
| | | | 250/559.07 |
| 2008/0187220 A1* | 8/2008 | Doretto ................. | G06K 9/4614 |
| | | | 382/173 |
| 2014/0236653 A1* | 8/2014 | Farrell ................. | G07G 1/0036 |
| | | | 705/7.15 |
| 2016/0239922 A1* | 8/2016 | Jimenez ................. | G06Q 40/08 |

* cited by examiner

*Primary Examiner* — Florian M Zeender
*Assistant Examiner* — Nicole Elena Bruner
(74) *Attorney, Agent, or Firm* — Y. Kamaal Patterson

(57) ABSTRACT

A checkout lane management system is described that uses object recognition to order a plurality of checkout lanes according to estimated checkout periods per checkout lane. The checkout lane management system may comprise one or more cameras for collecting a stream of images focused on the plurality of checkout lanes. The checkout lane management system also comprises a plurality of indicator lights for the plurality of checkout lanes that illuminate according to a plurality of light intensity values.

20 Claims, 7 Drawing Sheets

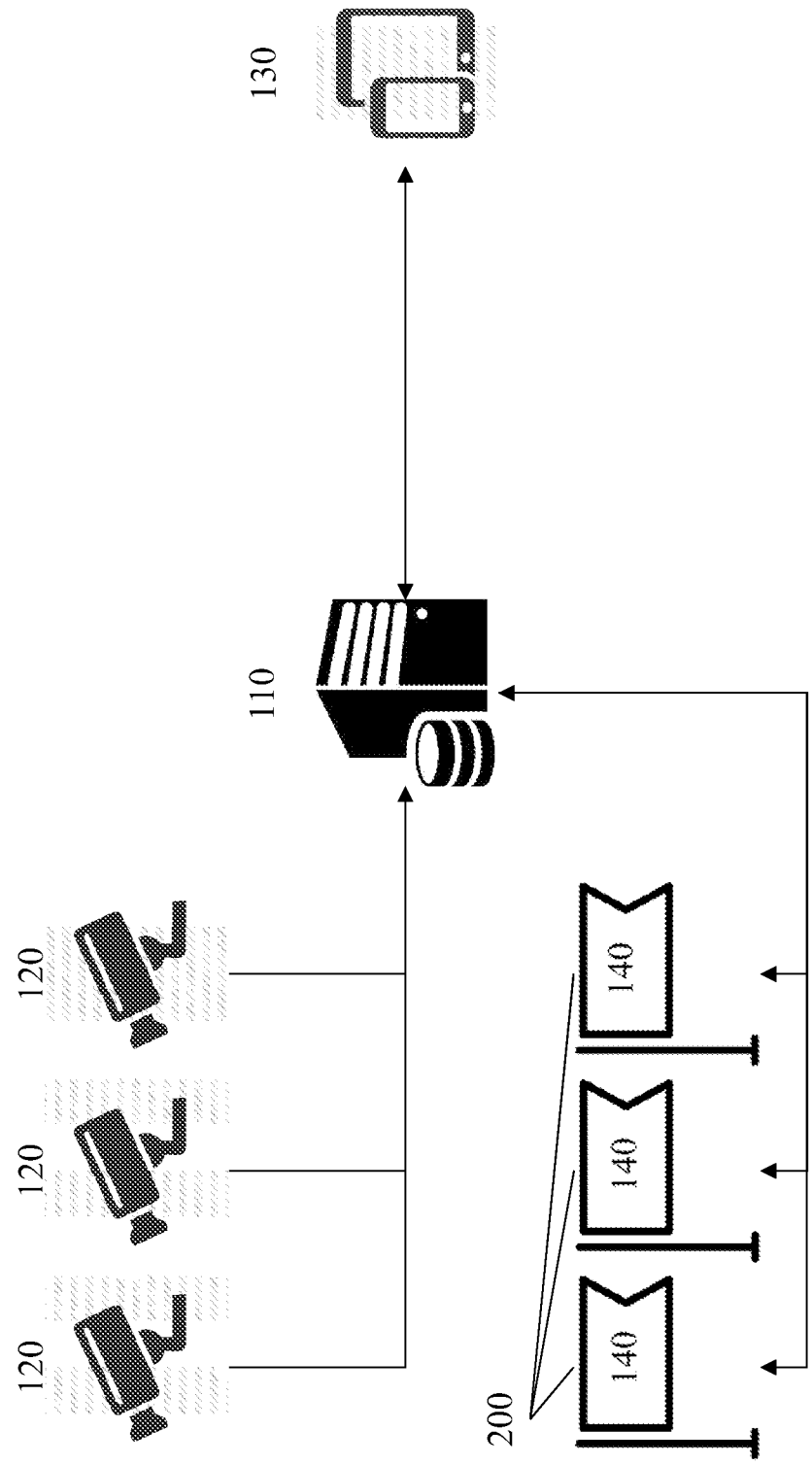

200

200

300

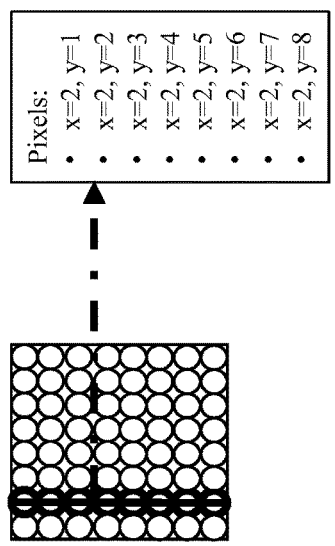
FIG. 4A
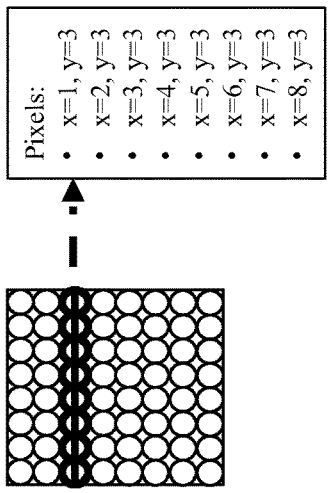
FIG. 4B
FIG. 4C
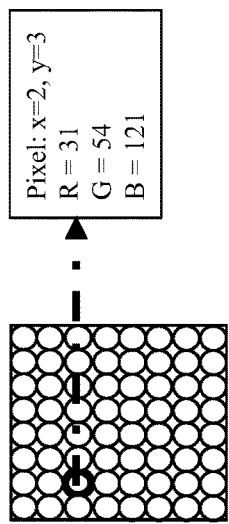
FIG. 4D
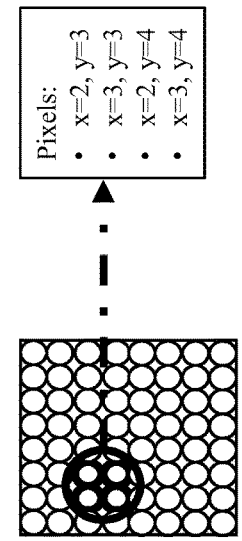
FIG. 4E

500

OBJECT RECOGNITION SYSTEM FOR CHECKOUT LANE MANAGEMENT

BACKGROUND OF THE INVENTION

Checkout lanes at retail store locations like grocery stores present a pressure point for the customer experience and business transactions of those retail stores. Customers at retail store locations demand retail store locations operate with speed and efficiency for the checkout process. This is particularly true in light of increased competition for retail store locations from online shopping sites that offer similar or expanded product offerings, fast checkouts (e.g., one-click checkout processes), and shipping times that continue to become faster and cheaper than in years past.

Currently, people shopping at retail store locations that are prepared to checkout and pay for their items depend on limited information and personal choices when choosing a line to enter at a retail store such as a grocery store or supermarket. The current process for retail locations with a plurality of checkout lanes consists of customers (or retail store attendants) viewing the lines at each of the checkout lanes, making a personal judgment about estimated waiting times, possibly making a personal judgment about a checkout lane attendant's checkout efficiency, and then choosing a line to enter and queue for the checkout process.

SUMMARY OF THE INVENTION

The present invention enables a checkout lane management system that manages a plurality of checkout lanes to a retail store. One or more cameras capture a stream of images focused on the plurality of checkout lanes to the retail store. The stream of images are processed and analyzed to determine a checkout status for each of the plurality of checkout lanes. A checkout status includes a CIP value indicating whether a checkout is in progress at the checkout lane and an estimated checkout period indicating how long it will take a customer to have the customer's items scanned, bagged, and payment completed for the customer to leave the checkout lane. The plurality of checkout lanes may be ordered according to their estimated checkout periods. The ordering of the plurality of checkout lanes is then translated to light intensity values that are communicated to corresponding indicator lights at the plurality of checkout lanes. The indicator lights illuminate based on the light intensity values to communicate to customers which checkout lanes are likely to provide a faster checkout experience than other checkout lanes from the plurality of checkout lanes.

A lane management system in accordance with the present invention includes at least one camera, a plurality of checkout lanes, a computing device comprising a plurality of computing components, and a plurality of indicator lights, where each indicator light is secured to a part of the checkout lane (e.g., to a lane indicator pole) from the plurality of checkout lanes. The computing device of lane management system comprises a recognition component, a collection component, an analyzing component, an ordering component, a translation component, and a communication component.

BRIEF DESCRIPTION OF THE DRAWINGS

For a more complete understanding of the invention and some advantages thereof, reference is now made to the following descriptions taken in connection with the accompanying drawings in which:

FIG. 1 is a high level view of connected system components.

FIG. 4A-4E are figures demonstrating exemplary zoomed-in view of pixels from a recognition polygon.

DETAILED DESCRIPTION

Figure 2A:
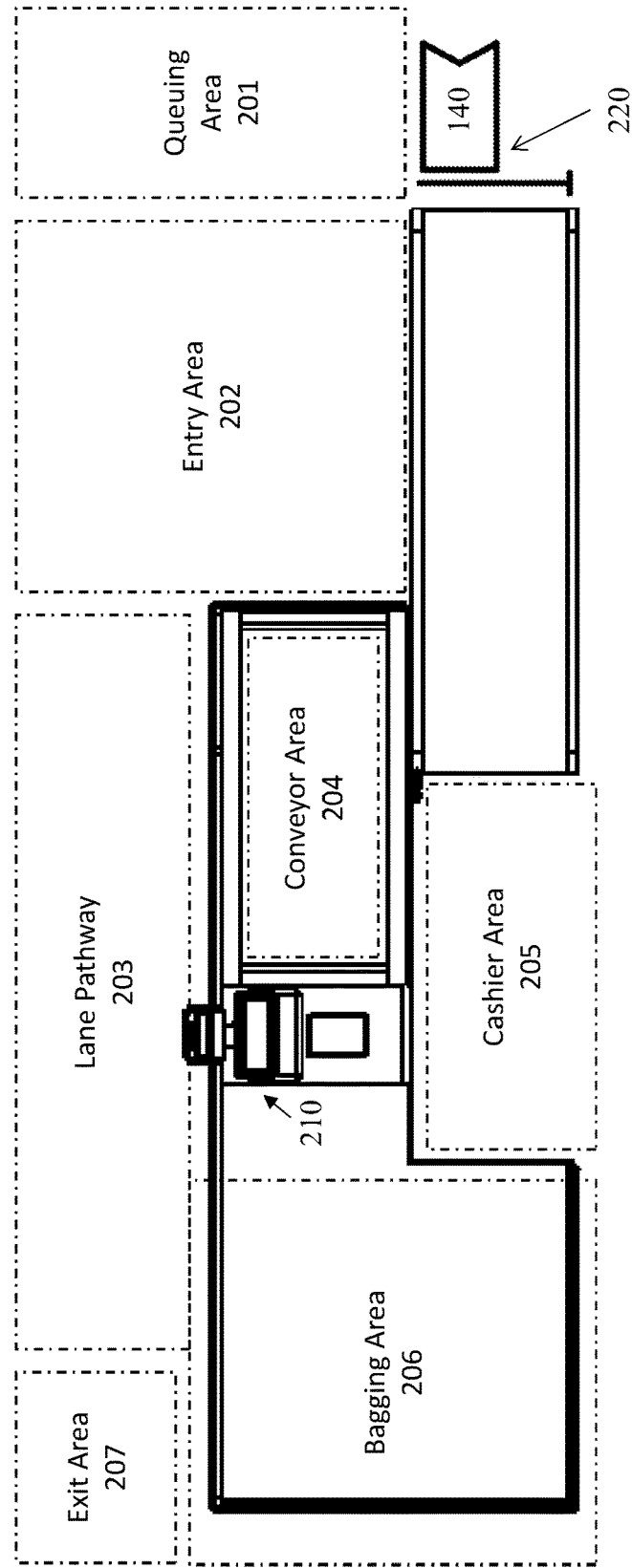
FIG. 2A-2B are an exemplary overhead views of a checkout lane.

In accordance with the present disclosure, a lane management system 100 is described that enables management of a plurality of checkout lanes 200 to a retail store. As seen in FIG. 1, a computing device 110 from the system 100 routes communications and information from the plurality of checkout lanes 200 through a plurality of cameras 120 positioned to capture a stream of images at the plurality of checkout lanes 200. The system 100 may further route communications and information to manager devices 130 and/or checkout lane registers 210.

Figure 2B:
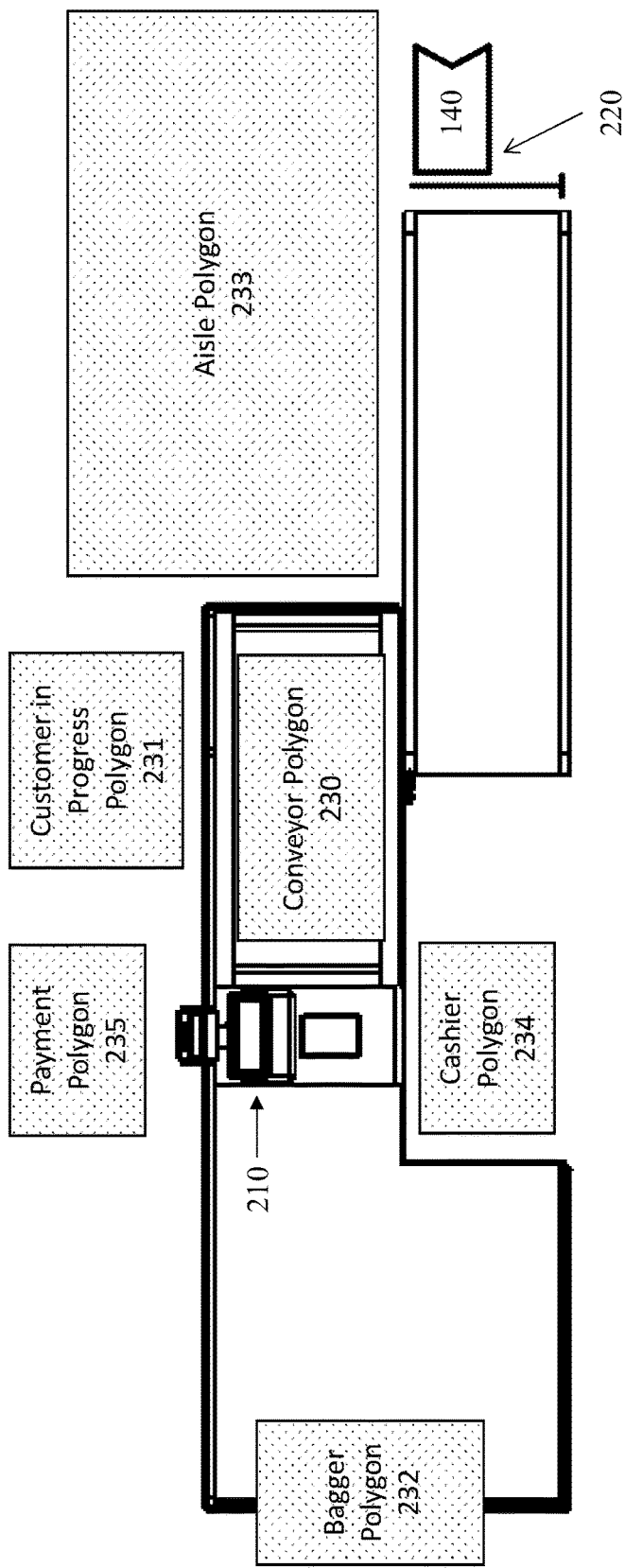
Figure 3:
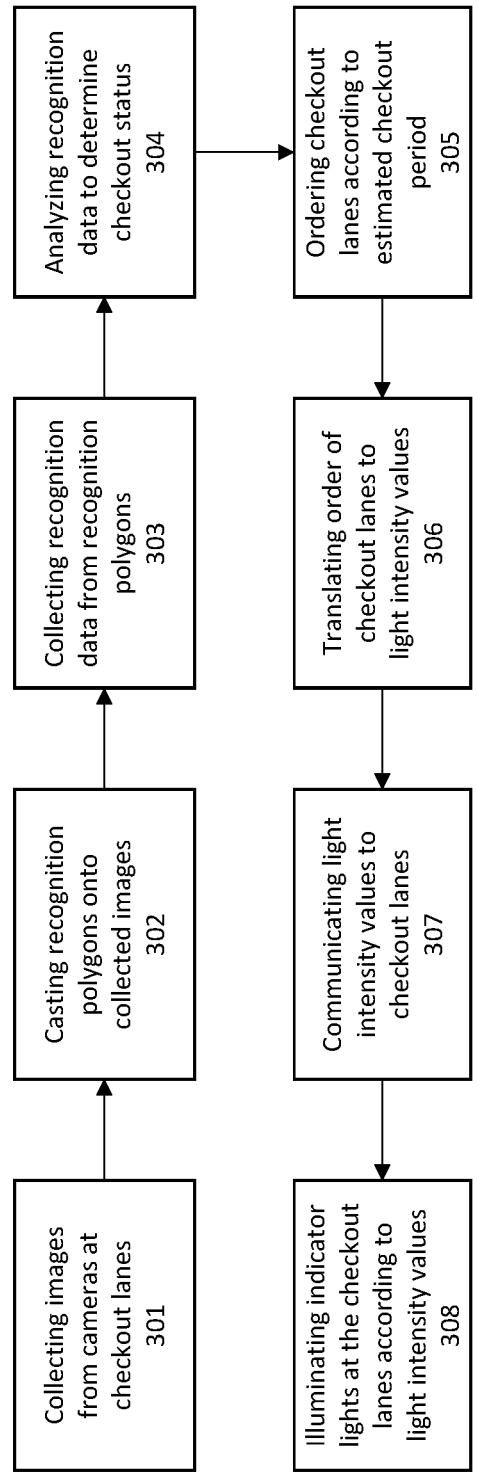
FIG. 3 is an exemplary method of collecting images for a checkout lane.

As seen in FIGS. 2A and 2B, the system 100 includes a plurality of cameras 120 to collect a stream of images from a plurality of checkout lanes 200. FIG. 3 provides an exemplary set of steps 300 for collection and processing of the stream of images from the plurality of checkout lanes 200. The plurality of cameras 120 may be positioned in a number of locations at the retail store location. In embodiments of the present disclosure, one or more cameras 120 may be positioned at individual checkout lanes 200 in an overhead position secured to, for instance, a lane indicator 220 that delineates the checkout lane 200 (e.g., by lane number). In other embodiments of the present disclosure, one or more cameras 120 may be positioned in the overhead ceiling of the retail store location, where such cameras 120 include the plurality of checkout lanes 200 within the view of the cameras 120. In yet other embodiments of the present disclosure, the plurality of cameras 120 may be positioned in a combination of placements for individual checkout lanes 200 (e.g., secured to the individual lane indicators 220) and the overhead ceiling of the retail store location.

Each camera 120 for a checkout lane 200 is positioned to capture a stream of images for processing of images containing data for the lane management system 100 described in the present disclosure (Step 301 of FIG. 3). A single camera 120 may be positioned to capture an entire checkout lane 200. In alternative embodiments, a combination of cameras 120 may be positioned to capture the entire checkout lane 200. The entire checkout lane 200, from an overhead of vantage point, may include: a queuing area 201 ahead of an entry area 202; the entry area 202 ahead of a lane pathway 203; a conveyor area 204 for the checkout lane 200 that is parallel (or substantially parallel) with the lane pathway 203; a cashier area 205 ahead of but off-center from the conveyor area 204; a bagging area 206 ahead of the conveyor area 204 and cashier area 205; and an exit area 207 parallel (or substantially parallel) to the bagging area 206 and at the opposite end of the lane pathway 203 from the entry area 202.

The cameras 120 collect a stream of images from the plurality of checkout lanes 200 and pass the stream of images to the computing device 110 for processing. Images received from each checkout lane 200 have recognition polygons cast upon the images (Step 302 of FIG. 3). Casting of one or more recognition polygons is done on predetermined areas of each of image from the stream of images at an individual checkout lane 200. In embodiments of the invention, casting is of a plurality of recognition polygons on predetermined areas of each image.

Recognition polygons may be a variety of types that associate with predetermined areas of an image. The types of recognition polygons are conveyor polygons 230, customer-in-progress polygons 231, bagger polygons 232, aisle polygons 233, cashier polygons 234, and customer payment polygons 235. Recognition polygons are focused on particular parts of the image collected from the camera (or cameras) 120 focused on the checkout lane 200. For purposes of this disclosure, the term "recognition polygon" is used; one of ordinary skill in the art would recognize the ability to use a variety of alternative shapes for casting and collecting data from areas of an image (e.g., shapes that are triangular, rectangular, quadrilateral (e.g., trapezoidal), pentagonal, etc.).

The predetermined areas of an image that may have a recognition polygon cast for image data collection correspond to particular parts to the checkout lane 200. The conveyor polygon 230 may be associated with image data corresponding to all or part of the conveyor area 204 to a checkout lane 200. The customer-in-progress polygon 231 may be associated with image data corresponding to all or part of the conveyor area 204 and lane pathway 203 to a checkout lane 200. The bagger polygon 232 may be associated with image data corresponding to all or part of the bagging area 206 to a checkout lane 200. The aisle polygon 233 may be associated with image data corresponding to all or part of the queuing area 201, entry area 202, and lane pathway 203 to the checkout lane 200. The cashier polygon 234 may be associated with image data corresponding to all or part of the cashier area 205 to the checkout lane 200. The customer payment polygon 235 may be associated with image data corresponding to all or part of the cashier area 205 and lane pathway 203 to the checkout lane 200.

Recognition data is collected from the recognition polygons cast on each of the predetermined areas of each image (Step 303 of FIG. 3). Recognition data for each pixel within the one or more areas cast by each recognition polygon may include color data and coordinate data. Recognition data for each pixel may also include (or be associated with) timestamp data collected for the image from which recognition polygons are cast. Recognition data for each recognition polygon may be stored using a data structure that organizes a combination of color data, coordinate data, and timestamp data according to: (i) which recognition polygon the recognition data originated from, (ii) which image the recognition polygon was cast upon, and (iii) which checkout lane 200 the image was collected from.

Recognition data collected from the one or more recognition polygons is then analyzed to iteratively determine a checkout status for each of the plurality of checkout lanes 200 (Step 304 of FIG. 3). Embodiments of the present disclosure using an iterative determination process may be responsive to a desire for continuous monitoring of checkout lanes 200 that have an "in service" status for the checkout and payment of items at the retail store. The checkout status for a checkout lane 200 may include a CIP value and an estimated checkout period. The CIP value is a "customer-in-progress" value associated with answering the question whether there is a customer at the retail store location currently having items scanned, registered for checkout and payment, and authorized for bagging and/or carry-out by the purchasing store customer. In embodiments of the present disclosure, the estimated checkout period is a time value providing an estimated time on a per customer basis for a customer to enter and exit a checkout lane 200. In other embodiments of the present disclosure, the estimated checkout period may be a range of time values (e.g., a lower estimated time and an upper estimated time) providing estimated times on a per customer basis for a customer to enter and exit a checkout lane 200.

Entry into the checkout lane 200 may be identified by recognition data demonstrating a customer has entered the lane pathway 203 to the checkout lane 200 (e.g., the body of the customer or a cart for the customer that entered into a predetermined area of a particular recognition polygon). In other embodiments, entry into the checkout lane 200 may be identified by recognition data demonstrating a customer has entered into the queuing area 201 or entry area 202 of a checkout lane 200 with at least one other earlier-arrived customer (e.g., a customer with a checkout-in-progress). Exiting the checkout lane may be identified by recognition data demonstrating a customer has exited the lane pathway 203 to the exit area 207 of the checkout lane 200 (e.g., the body of the customer or a cart for the customer that exited from a predetermined area of a particular recognition polygon). In other embodiments, exiting from the checkout lane 200 may be identified by recognition data demonstrating a customer's items have exited a checkout lane 200 area (e.g., the bagging area 206 of the checkout lane 200).

Analyzing recognition data to determine a checkout status for a checkout lane 200 may include the comparison of baseline data against recognition data from images collected at the checkout lane. Baseline data comprises color data and coordinate data for times when a checkout lane 200 is known to not have any checkouts in progress. Baseline data provides a baseline for what the checkout lane 200 looks like without a customer in the checkout lane pathway 203, items on the checkout lane conveyor area 204, and/or items in the bagging area 206 of a checkout lane. Baseline data is image data for a checkout lane 200 from the one or more recognition polygons cast on image data collected from a checkout lane 200 without a checkout in progress. The recognition polygons for baseline data are cast for each predetermined area of the checkout lane 200 that will have recognition data processed to determine the checkout status for the checkout lane 200. For example, if recognition data is collected from a conveyor polygon 230, a customer-in-progress polygon 231, and a bagger polygon 232 cast on the images collected while a checkout lane 200 has an "in service" status, then the baseline data would be recognition data collected from the same set of recognition polygons but captured when the checkout lane 200 has an "out of service" status without any customer going through the checkout lane 200.

Comparison of baseline data against recognition data from images collected at the checkout lane 200 may comprise a number of image analysis techniques. Techniques may include image data subtraction, addition, calculation of one or more products, averaging, transform, and use of logical operators, among other techniques known to those of ordinary skill in the art.

In greater detail, analyzing recognition data and comparing baseline data with recognition data to determine a checkout status for a checkout lane 200 may comprise a number of steps. In embodiments of the present disclosure, the recognition data from recognition polygons cast on image data collected at the "in service" checkout lane 200 may be sampled. Sampling may be done in order to manage the number of calculations performed by the computing device 110 when analyzing a stream of images from the checkout lane 200. For example, instead of performing a comparison for all pixels from the recognition data collected for the recognition polygons, sampling may be done to perform a comparison on a subset of pixels from the recognition data. Furthering the preceding example, if each image collected at a checkout lane 200 is a 720 p image with 921,600 pixels and a conveyor polygon 230 is one of the recognition polygons that corresponds to a total of 46,080 pixels (or 5% of the pixels to the image), then rather than performing a comparison across baseline data and recognition data for 46,080 pixels of each predetermined area, the computing device 110 may sample at a delta rate and only compare a subset of pixels (e.g., 460 pixels using a delta rate of 1 pixel per 100 pixels) for the baseline data against the recognition data for that conveyor polygon 230.

As indicated by the preceding disclosed example, recognition data for an image collected from an "in service" checkout lane 200 is compared with appropriate baseline data for an "out of service" checkout lane 200. In embodiments of the present disclosure, the recognition data from a recognition polygon is compared with the baseline data from that recognition polygon in a one-to-one correspondence of coordinate data. For example, as seen in FIG. 4A, if a pixel with coordinate data of (x=2; y=3) is captured as recognition data from a recognition polygon for an image collected from an "in service" checkout lane 200, then that pixel will be compared with the same pixel having coordinate data of (x=2; y=3) from an image captured for creation and storage of baseline data. In other embodiments of the present disclosure, the recognition data from a recognition polygon is compared with the baseline data from that recognition polygon in a relative correspondence of coordinate data. For example, if a pixel with coordinate data of (x=2; y=3) is captured as recognition data from a recognition polygon for an image collected from an "in service" checkout lane 200, then that pixel may be compared with one or more pixels having coordinate data in a related formation from an image captured for creation and storage of baseline data. As seen in FIG. 4B-4E, the related formation may be a horizontal line, a vertical line, a rectangular area, or a circular area; one of ordinary skill in the art would recognize the ability to use a variety of alternative shapes for related formations (e.g., shapes that are triangular, quadrilateral (e.g., trapezoidal), pentagonal, etc.).

Comparison of the recognition data with the baseline data (e.g., through a sampling) may then lead to a calculation of a set of delta color values. Results from the comparison of recognition data with the baseline data may be stored as the set of delta color values. In embodiments of the present disclosure, the set of delta color values may maintain its correspondence to the predetermined areas for the recognition areas analyzed through casting of the recognition polygons on an image collected at an "in service" checkout lane. The set of delta color values may then be transformed to a delta checksum. The delta checksum is a way to aggregate comparison data (i.e., color data, coordinate data, timestamp data, and delta color values) across the plurality of pixels from recognition data and baseline data into a single value. The delta checksum may then be compared with a delta threshold, which is used as an anchor for the system to judge whether a checkout is in progress or not. For example, in some embodiments, if the delta checksum is equal to the delta threshold, then the CIP value of the checkout lane's checkout status may be set to "true", "1", or "active". In other exemplary embodiments, if the delta checksum is less than or equal to the delta threshold, then the CIP value of the checkout lane's checkout status may be set to "false", "0", or "inactive". In still other alternative embodiments, if the delta checksum is greater than or equal to the delta threshold, then the CIP value of the checkout lane's checkout status may be set to "true", "1", or "active".

In related embodiments, the computing device 110 may require further use of the comparison between the delta checksum and the delta threshold before determining to set (or change) the CIP value as active or inactive, or such statuses' respective equivalents (e.g., true and false). For example, the delta checksum may be required to exceed (for example) a predetermined magnitude of difference from the delta threshold before setting the CIP value of the checkout status for a checkout lane 200. In still further examples, the delta checksum may be required to be (for example) less than the delta threshold for a series of ordered images before setting the CIP value of the checkout status for a checkout lane 200. The series of ordered images collected from a checkout lane 200 may be required to be a consecutive series; for example, the delta checksum may be required to be (for example) less than the delta threshold for 2 or more images in a row (e.g., each image representing one second in time) before setting the CIP value to inactive. In another example, the delta checksum may be required to be (for example) less than the delta threshold for more than 50% of the images collected over a span of time (e.g., every 5 seconds). In a combination of exemplary embodiments, the delta checksum may be required to exceed (for example) a predetermined magnitude of difference from the delta threshold for a series of ordered images before setting the CIP value of the checkout status for a checkout lane 200.

Calculating an estimated checkout period may be performed according to a time lapse between a checkout lane's CIP value being set to active (or an equivalent, such as "true") and when the checkout lane's CIP value switches to inactive (or an equivalent, such as "false"). In some embodiments, the computing device 110 may record when a checkout lane's CIP value flips to active as a starting point for the time lapse. The computing device 110 may then record when the checkout lane's CIP value flips to inactive as an ending point for the time lapse. The estimated checkout period is then calculated using the starting point and the ending point for the time lapse. In other embodiments, the computing device 110 may start a timer function when a checkout lane's CIP value flips to active as a starting point for the time lapse, and then the computing device 110 may stop the timer function when the checkout lane's CIP value flips to inactive as an ending point for the time lapse.

The computing device 110 calculates estimated checkout periods for each of the plurality of checkout lanes 200 at the retail store location. One of ordinary skill in the art recognizes that calculations of the estimated checkout periods may be limited to those checkout lanes 200 that have an "in service" lane status. Once the estimated checkout periods are established for each applicable checkout lane 200, the computing device 110 may order the checkout lanes according to their estimated checkout periods. The ordering is accomplished through a weighting algorithm, e.g., placing the checkout lane 200 with the shortest estimated checkout period at the top of the list followed by each checkout lane 200 that has a successively longer estimated checkout period. The weighting algorithm may include different weighting factors associated with a checkout lane 200. For example, checkout lanes 200 closer to an exit and/or entrance to the retail store location may be given a different weight than checkout lanes 200 closer to the center of a row of the checkout lanes 200. As another example, checkout lanes 200 in a first row of checkout lanes 200 closer to the entrance and/or exit of a retail store location may be given different weights than checkout lanes in a second row of checkout lanes 200 further from the entrance and/or exit of the retail store location. Weighting factors associated with a checkout lane 200 may be used to affect the ordering for which checkout lane 200 appears to have the shortest estimated checkout period, as displayed by indicator lights 140 described below.

The checkout status for a checkout lane 200 may also include an estimated checkout volume. In embodiments of the present disclosure, the estimated checkout volume is a numerical value providing an estimated volume of items being processed at a checkout lane 200. In other embodiments of the present disclosure, the estimated checkout volume may be a range of numerical values (e.g., a lower estimated volume and an upper estimated volume) providing estimated volumes on a per customer basis for each customer at a checkout lane 200. The estimated checkout volume may be determined using one or more of a customer count, a cart count, and an item count.

Recognition data demonstrating a customer has entered into or exited from one or more of the queuing area 201, entry area 202, and lane pathway 203 of the checkout lane 200 may be tracked with a customer count. Analyzing recognition data by comparison of baseline data against recognition data from images collected at the checkout lane 200 may identify a customer's body. Recognition data for identifying a customer in one or more of the queuing area 201, entry area 202, and lane pathway 203 may be collected from an aisle polygon 233, customer-in-progress polygon 231, and/or customer payment polygon 235. When a customer's body is identified within one or more of the queuing area 201, entry area 202, and lane pathway 203 of the checkout lane 200, the computing device 110 may increase the customer count. When the customer's body is identified as having exited the lane pathway 203 of the checkout lane 200, the computing device 110 may decrease the customer count.

Recognition data demonstrating a cart is in one or more of the queuing area 201, entry area 202, and lane pathway 203 of the checkout lane 200 may be tracked with a cart count. Analyzing recognition data by comparison of baseline data against recognition data from images collected at the checkout lane 200 may identify a shopping cart. Recognition data for identifying a cart in one or more of the queuing area 201, entry area 202, and lane pathway 203 may be collected from an aisle polygon 233, customer-in-progress polygon 231, and/or customer payment polygon 235. When a cart is identified within one or more of the queuing area 201, entry area 202, and lane pathway 203 of the checkout lane 200 (e.g., identification of the cart within the aisle polygon 233), the computing device 110 may increase the cart count. When the cart is identified as having exited the lane pathway 203 of the checkout lane 200 (e.g., no longer identifying the cart within the aisle polygon 233), the computing device 110 may decrease the cart count.

Recognition data demonstrating checkout items are on the conveyor of the checkout lane 200 may be tracked with an item count. Analyzing recognition data by comparison of baseline data against recognition data from images collected at the checkout lane 200 may identify checkout items. Recognition data for identifying one or more checkout items in the conveyor area 204 or bagging area 206 may be collected from either or both of a conveyor polygon 230 and bagger polygon 232. When an item is identified within the conveyor polygon 230 of the checkout lane 200, the computing device 110 may increase the item count. When the item is identified as having entered the bagger polygon 232 of the checkout lane 200, the computing device 110 may decrease the cart count.

The computing device 110 calculates estimated checkout volumes for each of the plurality of checkout lanes 200 at the retail store location. One of ordinary skill in the art recognizes that calculations of the estimated checkout volumes may be limited to those checkout lanes 200 that have an "in service" lane status. One or more of the customer count, cart count, and item count may be aggregated to calculate the estimated checkout volume for an "in service" checkout lane 200. Similar to weighting for ordering "in service" checkout lanes 200, weighting factors may weight customer count, cart count, and item count differently. Once the estimated checkout volumes are established for each applicable checkout lane 200, the computing device 110 may order the checkout lanes 200 according to their estimated checkout volumes. This ordering is also accomplished through a weighting algorithm, e.g., placing the checkout lane 200 with the smallest estimated checkout volume at the top of the list followed by each checkout lane 200 that has a successively larger estimated checkout volume. As stated earlier in the present disclosure, weighting factors related to proximity of checkout lanes 200 to an exit and/or entrance of the retail store location may be applied when ordering two or more checkout lanes 200 from smallest estimated checkout volume to largest estimated checkout volume. The ordering of the two or more checkout lanes 200 may be displayed by indicator lights 140, as described below.

Once the plurality of checkout lanes 200 is ordered (Step 305 of FIG. 3), the ordering may be translated to a light intensity value for each of the plurality of checkout lanes 200 (Step 306 of FIG. 3). The light intensity value is communicated to each of the corresponding checkout lanes 200, where indicator lights 140 at each of the plurality of checkout lanes 200 receives the light intensity values (Step 307 of FIG. 3). The indicator lights 140 receive the light intensity value and respond by illuminating in a color, strength or combination of the two (Step 308 of FIG. 3). The illuminating indicator lights 140 at each of the plurality of checkout lanes 200 communicate expectations for how quickly a checkout lane 200 is processing items and completing purchasing transactions for customers to exit the store. For example, a first light intensity value sent to a first checkout lane 200 may translate to a green color illuminating from the indicator light 140 at the first checkout lane 200, a second light intensity value sent to a second checkout lane 200 may translate to a yellow color illuminating from the indicator light 140 at the second checkout lane 200, and a third light intensity value sent to a third checkout lane 200 may translate to a red color illuminating from the indicator light 140 at the third checkout lane 200. Customers and those of ordinary skill in the art would recognize the green-yellow-red color scheme indicates the order of which checkout lane 200 has the lowest current estimated checkout time (i.e., the first checkout lane 200 in this example) (or lowest current estimated checkout volume) and the highest current estimated checkout time (i.e., the third checkout lane 200 in this example) (or highest current estimated checkout volume). In addition to or in the alternative to color variations, the plurality of light intensity value sent to the plurality of checkout lanes 200 may associate with a lighting strength. For example, a first light intensity value sent to a first checkout lane 200 may translate to a strong (or bright) light illuminating from the indicator light 140 at the first checkout lane 200, a second light intensity value sent to a second checkout lane 200 may translate to a warm (but less bright) light illuminating from the indicator light 140 at the second checkout lane 200, and a third light intensity value sent to a third checkout lane 200 may translate to no light or a dull light illuminating from the indicator light 140 at the third checkout lane 200.

Figure 5:
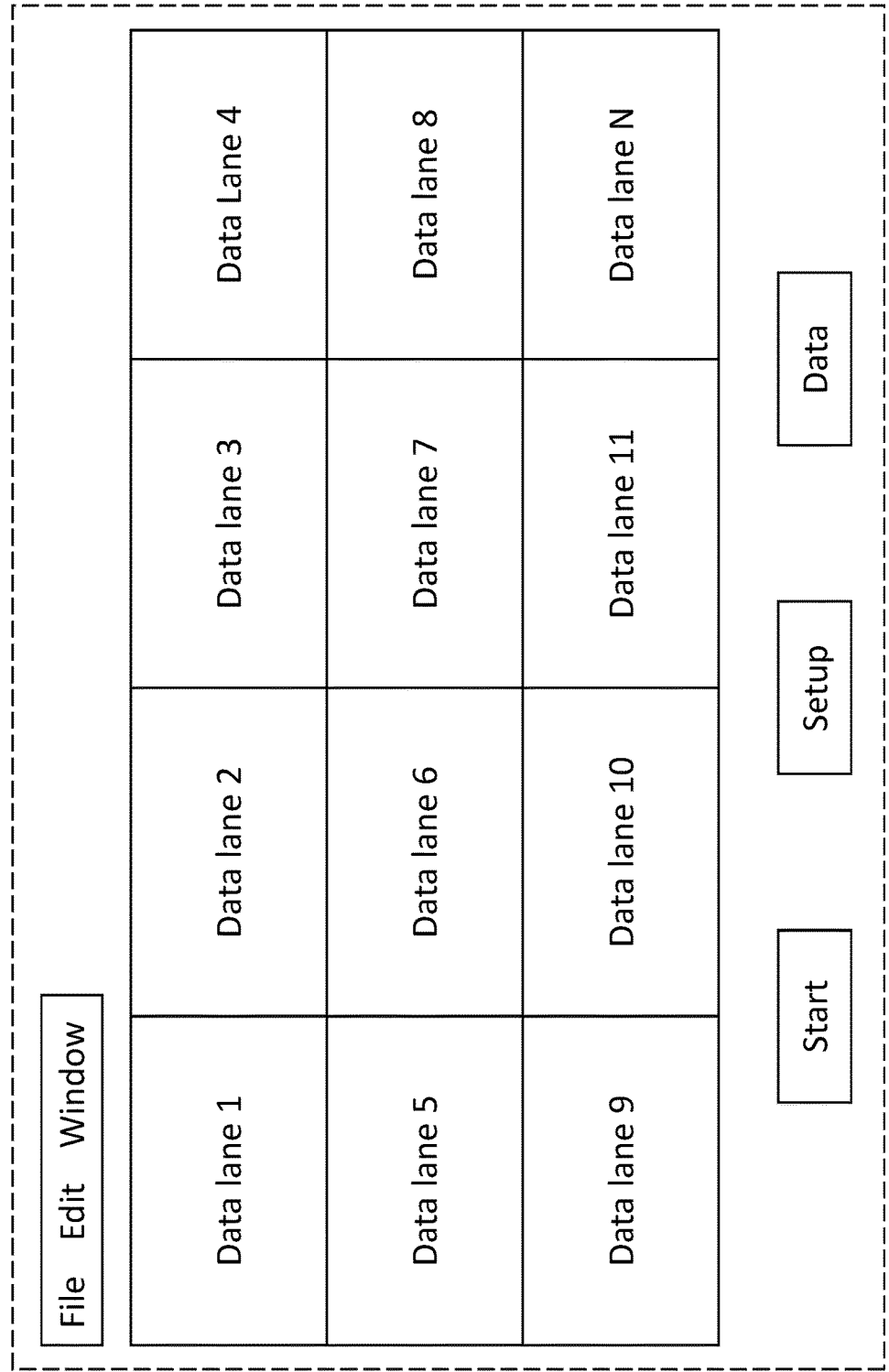
FIG. 5 is an exemplary embodiment of a user interface of a software application receiving light intensity values and other data from the lane management system.

In addition to sending the light intensity values to the indicator lights 140 at the plurality of checkout lanes 200, the light intensity values may also be sent to one or more manager devices 130 associated with the retail store location. The manager devices 130 may be a computational device such as a laptop, tablet, smartphone, or other similar device. The manager device 130 comprises a display with a user interface for a manager using the manager device 130 to display information associated with the light intensity values and the lane management system 100 described in the present disclosure. For example, a manager device 130 may receive the light intensity values (e.g., through a Wi-Fi or Bluetooth connection with the lane management system) and display an ordering of the plurality of checkout lanes 200 through a user interface for a software application 500 running on the manager device 130. The checkout status information for one or more of the plurality of checkout lanes 200 may also be displayed on the manager device 130. An exemplary embodiment of a user interface 500 displaying a screenshot of a software application receiving light intensity values and other data from the lane management system 100 is seen in FIG. 5.

A manager device 130 or components to the lane management system 100 may also build a checkout report that is made accessible and displayable on the manager device. The checkout report may be a composite report for all of the plurality of checkout lanes 200 at the retail store location. A composite report may report an average estimated checkout period (or estimated checkout volume) across all of the plurality of checkout lanes 200 at the retail store location for an analyzed period of time (e.g., for a specific day, week, month and/or year). In other embodiments, the checkout report may additionally or alternatively provide individual reports according to each individual checkout lane 200 from the plurality of checkout lanes 200 at the retail store location. Each individual report may report an average estimated checkout period (or estimated checkout volume) for that individual checkout lane 200 at the retail store location for an analyzed period of time (e.g., for a specific day, week, month, and/or year). In either sets of embodiments, the analyzed period of time may affect the calculation of the average estimated checkout period (or average estimated checkout volume) for the checkout lane(s) 200 in question. Once the checkout report is built, the checkout report may be viewed by a manager on a manager device 130, by displaying the checkout report through a user interface (e.g., a display) of the manager device 130.

Figure 6:
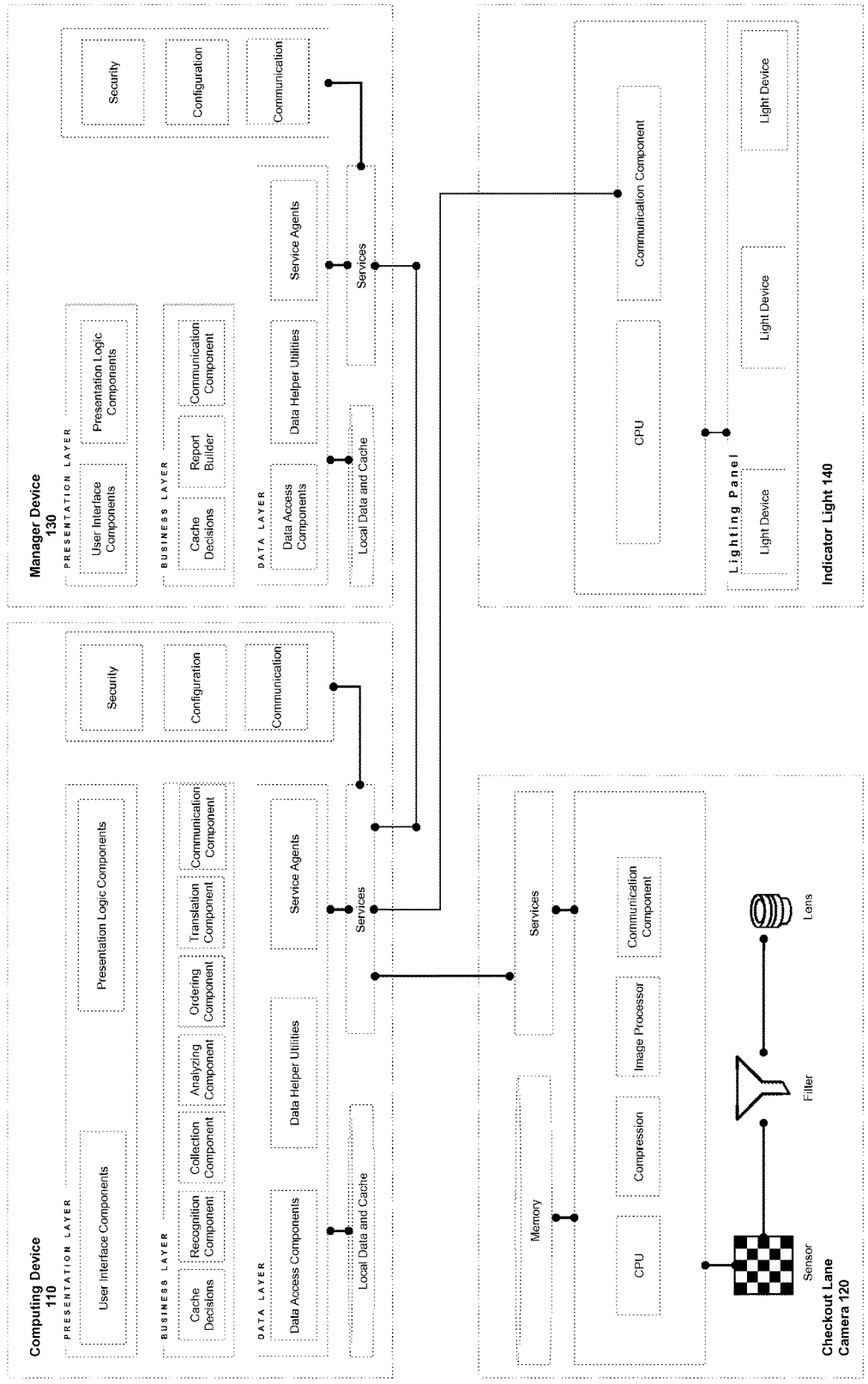
FIG. 6 is a high level architectural view of the computing device.

The lane management system 100 described in the present disclosure may comprise a number of components of hardware, software and a combination thereof. As described above, at least one camera 120 collects the stream of images incorporating the plurality of checkout lanes 200 in its view. A computing device 110 receives the stream of images from the one or more cameras 120 capturing the stream of images. A high level architectural view of the computing device 110, camera 120, manager device 130, and indicator light 140 is seen in FIG. 6. This computing device 110 may include a recognition component, a collection component, an analyzing component, an ordering component, a translation component, and a communications component. In embodiments, the analyzing component is designed to include or further comprise a comparison component, a calculation component, a transformation component, and a setting component. In additional embodiments, the computing device or one or more manager devices (as described above) may include a report builder, as well. Also as described above, the lane management system 100 also comprises the plurality of indicator lights 140 for communicating light intensity values for each of the corresponding plurality of checkout lanes 200. The indicator lights 140 may comprise its own communication component for communicating with the computing device 110, as well as one or more light devices (e.g., LED, CFL, incandescent light bulb, etc.) for illuminating according to light intensity values communicated to the indicator light 140. Each indicator light may be secured to or comprise part of a lane indicator pole 220 at a checkout lane 200.

Within the computing device 110, the recognition component casts the plurality of recognition polygons on the predetermined areas of each of the plurality of images captured by the at least one camera of the lane management system 100. The collection component of the computing device 110 collects recognition data from the plurality of recognition polygons cast on each of the images, where the recognition data comprises color data, coordinate data and timestamp data as described above. The analyzing component analyzes the recognition data to determine (e.g., on an iterative basis) the checkout status for each of the plurality of checkout lanes 200. As explained above, that checkout status includes a CIP value and an estimated checkout period (or estimated checkout volume).

The sampling component of the analyzing component may be integrated into the operations of the analyzing component to sample a plurality of pixels from the recognition data at a delta rate. The comparison component of the analyzing component may be integrated into the operations of the analyzing component to compare the plurality of pixels from the sampling component with a corresponding plurality of pixels from baseline data. As explained above, correspondence may be based on coordinate data for the plurality of pixels from the recognition data and the baseline data. The calculation component of the analyzing component may be integrated into the operations of the analyzing component to calculate a set of delta color values between the plurality of pixels from the sampling component and the plurality of pixels from baseline data. Additionally, in embodiment, the calculation component may further calculate the estimated checkout period (or estimated checkout volume) according to a time lapse between timestamp data for when the checkout status became active and timestamp data for when the checkout status became inactive. The transformation component of the analyzing component may be integrated into the operations of the analyzing component to transform the set of delta color values to a delta checksum and the comparison component compares the delta checksum against a delta threshold. The setting component of the analyzing component may be integrated into the operations of the analyzing component to set the CIP value of a checkout status for a checkout lane 200 to active or inactive depending on the delta checksum compared to the delta threshold.

The ordering component of the computing device 110 orders each of the checkout lanes 200 according to the estimated checkout periods (or estimated checkout volumes) through a weighting algorithm. The translation component of the computing device 110 translates the ordering of the plurality of checkout lanes 200 to a light intensity value for each of the plurality of checkout lanes 200. The communication component of the computing device 110 communicates the light intensity values to indicator lights 140 at each of the corresponding plurality of checkout lanes 200 associated with the light intensity values. In embodiments of the present disclosure, the communication component may also receive a cashier input at the checkout register 210 calling for manager assistance (i.e., a manager request). The communication component may receive and send a notification to a manager device of an "on" status for the manager request or a notification to the manager device 130 of an "off" status to update the manager if manager assistance is no longer needed.

While the present invention has been described above in particular detail with respect to a limited number of embodiments, other embodiments are possible as well. The particular naming of the components and their programming or structural aspect is not mandatory or significant, and the mechanisms that implement the invention or its features may have different names, formats, or protocols. Further, the system 100 may be implemented via a combination of hardware and software, as described, or entirely in hardware elements. Also, the particular division of functionality between the various system components described herein is merely exemplary, and not mandatory; functions performed by a single system component may instead be performed by multiple components, as illustrated for example by the description of FIG. 6, and functions performed by multiple components may instead performed by a single component.

The operations described above, although described functionally or logically, may be implemented by computer programs stored on one or more computer readable media and executed by a processor. Computer readable storage media include, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Throughout the description, discussions using terms such as "processing" or "computing" or "calculating" or "determining" or "displaying" or "analyzing" or the like, refer to the action and processes of a particular computer system, or similar electronic computing device, that manipulates and transforms data representing or modeling physical characteristics, and which is represented as physical (electronic) quantities within the computer system memories or registers or other such information storage, transmission or display devices.

The algorithms and displays presented above are not inherently related to any particular computer or other apparatus. Various general-purpose systems may also be modified by using the teachings herein, or it may prove convenient to construct more specialized apparatus to perform the described method steps. The required structure for a variety of these systems will appear from the description above. In addition, the present invention is not described with reference to any particular programming language, any suitable one of which may be selected by the implementer.

Finally, it should be noted that the language used in the specification has been principally selected for readability and instructional purposes, and may not have been selected to delineate or circumscribe the inventive subject matter.

Accordingly, the disclosure of the present invention is intended to be illustrative, but not limiting, of the scope of the invention.

What is claimed:

1. A method for checkout lane management at a retail store location, the method comprising:
   collecting a stream of images from a plurality of checkout lanes;
   casting a plurality of recognition polygons on predetermined areas of each of the images;
   collecting recognition data from the plurality of recognition polygons cast on each of the images, where the recognition data includes color data, coordinate data and timestamp data;
   analyzing the recognition data to iteratively determine a checkout status for each of the plurality of checkout lanes, where the checkout status includes a CIP value and an estimated checkout period;
   ordering each of the checkout lanes according to estimated checkout periods through a weighting algorithm;
   translating the ordering of the plurality of checkout lanes to a light intensity value for each of the plurality of checkout lanes;
   communicating the light intensity values to each of the corresponding plurality of checkout lanes associated with the light intensity values; and
   illuminating indicator lights at each of the plurality of checkout lanes according to the light intensity value for the associated checkout lane.

2. The method of claim 1, wherein the plurality of recognition polygons include a conveyor polygon, a customer-in-progress polygon, and a bagger polygon.

3. The method of claim 1, wherein analyzing the recognition data includes comparing baseline data against recognition data.

4. The method of claim 1, wherein analyzing the recognition data includes:
   sampling a plurality of pixels from the recognition data at a delta rate;
   comparing the plurality of pixels from sampling with a corresponding plurality of pixels from baseline data, where correspondence is based on coordinate data;
   calculating a set of delta color values between the plurality of pixels from sampling and the plurality of pixels from baseline data;
   transforming the set of delta color values to a delta checksum;
   comparing the delta checksum against a delta threshold; and
   setting the checkout status to active when the delta checksum is equal to or greater than the delta threshold.

5. The method of claim 4, wherein analyzing the recognition data includes:
   setting the checkout status to inactive when the delta checksum is less than the delta threshold; and
   calculating the estimated checkout period according to a time lapse between timestamp data for when the checkout status became active and timestamp data for when the checkout status became inactive.

6. The method of claim 1 further comprising:
   communicating the checkout status and light intensity values for the plurality of checkout lanes to a manager device; and
   displaying the checkout status and light intensity values through a user interface on the manager device.

7. The method of claim 1 further comprising:
building a checkout report for each of the plurality of checkout lanes that includes average estimated checkout periods for each of the plurality of checkout lanes for an analyzed period of time;
communicating the checkout report to a manager device; and
displaying the checkout report through a user interface on the manager device.

8. A checkout lane management system at a retail store location, the system comprising:
at least one camera for the collection of a stream of images from a plurality of checkout lanes;
a computing device that receives the stream of images from the plurality of checkout lanes, the computing device including
a recognition component that casts a plurality of recognition polygons on predetermined areas of each of the images,
a collection component that collects recognition data from the plurality of recognition polygons cast on each of the images, where the recognition data comprises color data, coordinate data and timestamp data,
an analyzing component that analyzes the recognition data to iteratively determine a checkout status for each of the plurality of checkout lanes, where the checkout status includes a CIP value and an estimated checkout period,
an ordering component that orders each of the checkout lanes according to the estimated checkout periods through a weighting algorithm,
a translation component that translates the ordering of the plurality of checkout lanes to a light intensity value for each of the plurality of checkout lanes,
a communication component that communicates the light intensity values to each of the corresponding plurality of checkout lanes associated with the light intensity values; and
a plurality of indicator lights at each of the plurality of checkout lanes that illuminate according to the light intensity value for the associated checkout lane.

9. The system of claim 8, wherein the plurality of recognition polygons include a conveyor polygon, a customer-in-progress polygon, and a bagger polygon.

10. The system of claim 8, wherein the analyzing component compares baseline data against recognition data.

11. The system of claim 8, wherein the analyzing component further comprises:
a sampling component that samples a plurality of pixels from the recognition data at a delta rate;
a comparison component that compares the plurality of pixels from the sampling component with a corresponding plurality of pixels from baseline data, where correspondence is based on coordinate data;
a calculation component that calculates a set of delta color values between the plurality of pixels from the sampling component and the plurality of pixels from baseline data;
a transformation component that transforms the set of delta color values to a delta checksum and the comparison component compares the delta checksum against a delta threshold; and
a setting component that sets the checkout status to active when the delta checksum is equal to or greater than the delta threshold.

12. The system of claim 11, wherein:
the setting component further sets the checkout status to inactive when the delta checksum is less than the delta threshold; and
the calculation component further calculates the estimated checkout period according to a time lapse between timestamp data for when the checkout status became active and timestamp data for when the checkout status became inactive.

13. The system of claim 8, wherein:
the communicating component further communicates the checkout status and light intensity values for the plurality of checkout lanes to a manager device; and
the manager device includes a display device that displays the checkout status and light intensity values through a user interface.

14. The system of claim 8, further comprising:
a report builder that builds a checkout report for each of the plurality of checkout lanes that includes average estimated checkout periods for each of the plurality of checkout lanes for an analyzed period of time; and
the communication component further communicates the checkout report to a manager device, where the manager device includes a display device that displays the checkout report through a user interface.

15. A computer program product for checkout lane management at a retail store location, the computer program product stored on a non-transitory computer-readable medium and including instructions adapted to cause a computer to execute steps comprising:
collecting a stream of images from a plurality of checkout lanes;
casting a plurality of recognition polygons on predetermined areas of each of the images;
collecting recognition data from the plurality of recognition polygons cast on each of the images, where the recognition data includes color data, coordinate data and timestamp data;
analyzing the recognition data to iteratively determine a checkout status for each of the plurality of checkout lanes, where the checkout status includes a CIP value and an estimated checkout period;
ordering each of the checkout lanes according to estimated checkout periods through a weighting algorithm;
translating the ordering of the plurality of checkout lanes to a light intensity value for each of the plurality of checkout lanes;
communicating the light intensity values to each of the corresponding plurality of checkout lanes associated with the light intensity values; and
illuminating indicator lights at each of the plurality of checkout lanes according to the light intensity value for the associated checkout lane.

16. The computer program product of claim 15, wherein the plurality of recognition polygons include a conveyor polygon, a customer-in-progress polygon, and a bagger polygon.

17. The computer program product of claim 15, wherein analyzing the recognition data includes comparing baseline data against recognition data.

18. The computer program product of claim 15, wherein analyzing the recognition data includes:
sampling a plurality of pixels from the recognition data at a delta rate;
comparing the plurality of pixels from sampling with a corresponding plurality of pixels from baseline data, where correspondence is based on coordinate data;

calculating a set of delta color values between the plurality of pixels from sampling and the plurality of pixels from baseline data;

transforming the set of delta color values to a delta checksum;

comparing the delta checksum against a delta threshold; and setting the checkout status to active when the delta checksum is equal to or greater than the delta threshold.

19. The computer program product of claim 18, wherein analyzing the recognition data includes:

setting the checkout status to inactive when the delta checksum is less than the delta threshold; and calculating the estimated checkout period according to a time lapse between timestamp data for when the checkout status became active and timestamp data for when the checkout status became inactive.

20. The computer program product of claim 15 further comprising:

communicating the checkout status and light intensity values for the plurality of checkout lanes to a manager device; and displaying the checkout status and light intensity values through a user interface on the manager device.

\* \* \* \* \*